United States Patent Office 2,775,606
Patented Dec. 25, 1956

2,775,606

REACTION OF BENZENE AND DICHLOROSILANE TRICHLOROSILANE MIX

George H. Wagner, Clarence, and Paul W. Shafer, Niagara Falls, N. Y., assignors to Union Carbide and Carbon Corporation, a corporation of New York No Drawing. Application March 22, 1954,
Serial No. 417,922

10 Claims. (Cl. 260—448.2)

This invention relates to a process for the production of phenyldichlorosilanes, and, in particular, it relates to the production of phenyldichlorosilane.

Phenyldichlorosilane ($\phi$SiHCl$_2$) and diphenyldichlorosilane ($\phi_2$SiCl$_2$) are monomeric silicon chemicals useful as intermediates in the preparation of silicone resins, rubbers and oils. Phenyldichlorosilane, by virtue of its reactive silanic hydrogen atom is useful as an intermediate in forming other silane derivatives through reaction of its silanic hydrogen with other chemicals such as olefines.

Although the reaction of benzene with certain chlorosilanes, in particular, trichlorosilane is known, these reactions have been inapplicable to the production, in good yield and efficiency, of the phenyl dichlorosilanes. Consequently, the supply of phenyl dichlorosilanes has been dependent upon the expensive Grignard process of recovery of whatever low yields might occur as by-products in other processes such as the production of phenyltrichlorosilane from benzene and trichlorosilane. Thus it is an object of this invention to provide a rapid, economical process for the production of phenylchlorosilane products that are predominantly the dichlorosilanes, and, in particular, to provide a process for the production of phenyldichlorosilane.

A widely used process for the production of a phenylchlorosilane is that which utilizes the reaction of benzene with trichlorosilane (HSiCl$_3$) to produce phenyltrichlorosilane ($\phi$SiCl$_3$). This relation is known to produce phenyltrichlorosilane in good yield and efficiency. Furthermore, according to prior teaching, benzene and dichlorosilane (H$_2$SiCl$_2$) react to give diphenyldichlorosilane ($\phi_2$SiCl$_2$).

We have now made the surprising discovery that benzene reacts with a mixture of dichlorosilane and trichlorosilane to produce a phenylchlorosilane product which is, principally, neither phenyltrichlorosilane ($\phi$SiCl$_3$) nor diphenyldichlorosilane ($\phi_2$SiCl$_2$), but is phenyldichlorosilane ($\phi$SiHCl$_2$).

Although more than equimolar amounts of trichlorosilane (HSiCl$_3$) as compared with dichlorosilane (H$_2$SiCl$_2$) may be added in a reaction mixture of benzene, dichlorosilane and trichlorosilane, the production of the dichloro derivatives over the trichloro is favored many times over. Moreover, although sufficient benzene is present to react with both silanic hydrogen atoms on the dichlorosilane, the product is principally the monophenyl derivative, $\phi$SiHCl$_2$. Taking advantage of these unexpected results we have been able to react benzene with a mixture of dichlorosilane and trichlorosilane to produce only minor amounts of phenyltrichlorosilane while producing phenyl deratives of dichlorosilane at conversions of 60 to 80 percent.

In the practice of this invention the reaction conditions should be such that a liquid phase is present. Elevated temperatures are necessary to a reasonable reaction rate and since the normal boiling points of the reactants are less than the reaction temperatures, 150° to 500° C., pressure is necessary to maintain a liquid phase. For a static type of reaction, i. e., conducted in a sealed container, the autogenous pressure of the reactants plus the partial pressure of the evolved hydrogen provides a sufficient pressure under such conditions as result when 54.5 grams of benzene, 21.6 grams of dichlorosilane and 40.4 grams of trichlorosilane contained in a 300 ml. pressure vessel are heated to 150° C., as evidenced by the production of phenyldichlorosilane. Generally, however, the preferred pressure range is from 1,000 to 20,000 p. s. i. From the point of view of operation with commercially available equipment, the pressure range of 2,000 to 4,000 p. s. i. is especially preferred.

In our method of producing phenyldichlorosilane the unexpected benefits arising from the use of a mixture of dichlorosilane and trichlorosilane are evident at a molar proportion of HSiCl$_3$ to H$_2$SiCl$_2$ as low as 0.1 to 1. However, we have found that under conditions favoring a rapid reaction, namely pressures greater than 1,000 p. s. i. and temperatures greater than 300° C., better results are obtained by using a molar ratio of HSiCl$_3$/H$_2$SiCl$_2$ at least as great as 1/1. A mixture with this ratio as great as 2/1 has been used with success.

We have also found that trichlorosilane is a necessary constituent of the reaction mixture, in order that a product rich in phenyldichlorosilane be obtained. This is shown by the nature of the reaction product which results from reacting a mixture containing no trichlorosilane, only dichlorosilane and a catalyst, with benzene. This product contains several times as much diphenyldichlorosilane as phenyldichlorosilane, whereas, the product resulting from a mixture of dichlorosilane and trichlorosilane contains several times as much phenydichlorosilane as diphenyldichlorosilane. Since the nature of the reaction product obtained from dichlorosilane is directly opposite to the reaction product obtained from a mixture of dichlorosilane and trichlorosilane, it follows that trichlorosilane is a necessary constituent of the reaction mixture, if a product rich in phenyldichlorosilane is to be obtained.

In our process we produce phenyldichlorosilane from a reaction mixture of dichlorosilane and trichlorosilane in which the molar ratio of HSiCl$_3$/H$_2$SiCl$_2$ is as low as 0.1/1. Increased benefits accrue from greater molar ratios, and, from the point of view of operation in the temperature and pressure ranges feasible with commercially available equipment, a molar ratio of HSiCl$_3$/H$_2$SiCl$_2$ of from 1/1 to 2/1 is preferred.

Although a catalyst is not required in our method of producing phenyldichlorosilane (see Examples I and II) and although a rapid flow process in the absence of a catalyst is possible (phenyl derivatives of dichlorosilane in an amount up to 19.8 weight percent of the total outflow being produced at 470° C. and 20,000 p. s. i. at a calculated contact time of 0.99 minute), the use of a catalyst allows a more rapid reaction time at lower pressures. In particular, in the preferred pressure range of 1,000 to 4,000 p. s. i. and temperature range of 300° C. to 500° C. the use of catalyst results in a decreased reaction time and permits a rapid flow process.

Lewis acid catalysts of the metal halide type have been found to be effective in this reaction and this is shown in Table I. It has also been found that these catalysts can be made more effective by the addition of alkali metal hydride complexes, for example, lithium borohydride increases the activity of boron trichloride. Catalysts other than BCl$_3$ found to be effective are CbCl$_5$ and AlCl$_3$. Those catalysts were found to be satisfactorily effective below a concentration of 1 mole percent based on the total moles of reactants. The preferred catalyst is boron trichloride used at a concentration of 0.5 to 0.1 mole percent. Table I follows:

Table I

[Effect of various catalysts on the benzene-dichlorosilane reaction (0.5 or 0.7 mole benzene; 0.3 mole $HSiCl_3$; 0.2 mole $H_2SiCl_2$; 250° C. for 4 hours).]

| Catalyst | Mole Percent of Catalyst | Yield of Phenylchlorosilanes (Wt. percent) | Difunctional Content [1] of Phenylchlorosilanes (Wt. percent) |
|---|---|---|---|
| $BCl_3$ | 0.2 | 54.0 | 32.8 |
| (a) $BCl_3$ | 0.2 | 49.7 | 36.6 |
| $AlCl_3$ | 0.2 | 33.7 | 38.0 |
| (a) $CbCl_5$ | 0.2 | 33.0 | 49.4 |
| (a) $BCl_3$ | 0.5 | 29.0 | 71.9 |
| $LiBH_4$ | 1.5 | | |
| (a) $BCl_3$ | 0.5 | 27.1 | 74.9 |
| $LiBH_4$ | 1.5 | | |

(a) =0.7 mole of benzene.
[1] Difunctional content equals $\phi SiHCl_2$ content plus $\phi_2 SiCl_2$ content.

Benzene concentration in the reaction mixture, when varied too far from the preferred range, has been found to lead to two general effects. Too little benzene in the mixture results in the production of resinous by-products, rich in silicon and difficultly separable into pure materials. Too much benzene appears to act principally as a diluent, leading to a slow reaction rate and an undesirably low rate of production of phenyldichlorosilane. The range of benzene concentration in terms of the ratio, moles of benzene/moles of silanic hydrogen ($H_2SiCl_2$ having two moles and $HSiCl_3$ one) of from 1/1 to 3/1 has been found to give good results; the preferred range is from 1/1 to 2/1.

Our invention is the method for production of phenyldichlorosilane ($\phi SiHCl_2$) which comprises subjecting a reaction mixture of benzene, trichlorosilane and dichlorosilane in which the mole ratio of trichlorosilane to dichlorosilane is at least as great as 0.1/1 to elevated temperatures and pressures.

A satisfactory range of concentrations of benzene, in terms of the mole ratio of benzene to total silanic hydrogen is from 1 to 3 moles of benzene to 1 mole of silanic hydrogen. The mole ratio of trichlorosilane to dichlorosilane should be at least as great as 0.1 mole of trichlorosilane to 1 mole of dichlorosilane; a mixture with a ratio of 2 moles of trichlorosilane to 1 mole of dichlorosilane has been used with success, and this ratio may be even greater than 2 moles of trichlorosilane to 1 mole of dichlorosilane. A satisfactory range of pressure is from 1,000 to 20,000 p. s. i., and even higher pressures may be employed. Temperatures as low as 150° C. may be used; a temperature of 500° C. at 4,000 p. s. i. has given good results. Higher temperatures may be employed, however, temperatures appreciably greater than 500° C. tend to lower the efficiency of the desired reaction.

In the preferred practice of this invention a reaction mixture of benzene, trichlorosilane and dichlorosilane of a mole ratio of benzene to total silanic hydrogen of from 1 to 2 moles of benzene to 1 mole of silanic hydrogen, of a mole ratio of trichlorosilane to dichlorosilane of from 1 to 2 moles of trichlosilane to 1 mole dichlorosilane, temperatures of 300° C. to 500° C., and pressures of from 1,000 to 4,000 p. s. i. are employed.

A catalyst such as previously described may be used to promote a more rapid reaction. Static or continuous flow processes may be used in the practice of this invention and though the preferred range of variables is the same for both types of operation, in consideration of the commercially available equipment, a somewhat narrower range of pressures, 2,000 to 4,000 p. s. i. is especially preferred for a flow process.

The following examples illustrate the practice of this invention using a static type of process. In the product analyses of Example I and II, any diphenyldichlorosilane formed is contained in that portion listed as "high boiling residue," consequently, the amount by weight of diphenyl dichlorosilane produced is less than or, at most, equal to this weight. Product analysis in these examples was by fractional distillation followed by density measurements of the fractions; the analysis was confirmed by analyzing the fractions for hydrolizable hydrogen or chlorine, or both.

Examples I and II show the reaction of benzene and dichlorosilane without a catalyst.

EXAMPLE I

A reaction mixture of 95.1 grams of benzene and 100.5 grams of a 35–65 weight percent mixture of dichlorosilane and trichlorosilane were charged to a 300 cubic centimeter stainless steel pressure vessel. The vessel was placed in a rocking furnace and heated to 400° C. for 2 hours. A liquid product, 173 grams in weight, was recovered and separated by fractional distillation. The analysis of this product was as follows: 5.5 grams of dichlorosilane, 40.3 grams of trichlorosilane, 1.0 gram of silicon tetrachloride, 71 grams of benzene, 25.8 grams of phenyldichlorosilane, 7.7 grams of phenyltrichlorosilane and 16.0 grams of higher boiling residue.

EXAMPLE II

A reaction mixture of 95.0 grams of benzene and 113 grams of a 35–65 weight percent mixture of dichlorosilane and trichlorosilane were charged to the same 300 cubic centimeter stainless steel vessel used in Example I. The vessel was placed in a rocking furnace and heated to 400° C. for 2 hours. A liquid product weighing 187 grams was recovered and separated by fractional distillation yielding the following: 9.3 grams of dichlorosilane, 52.6 grams of trichlorosilane, 2.6 grams of silicon tetrachloride, 71.9 grams of benzene, 27.7 grams of phenyldichlorosilane, 6.9 grams of phenyltrichlorosilane, and 9.8 grams of high boiling residue.

EXAMPLE III

Example III shows, for comparison, the reaction of benzene and dichlorosilane without trichlorosilane.

A reaction mixture of 93.6 grams (1.2 moles) of benzene and 33.0 grams (0.3 mole) of dichlorosilane with 0.1 mole percent boron trichloride catalyst was charged to a 300 cubic centimeter stainless steel vessel. The vessel was placed in a rocking furnace and heated to 250° C. for 2 hours. After cooling to room temperature, the residual pressure was 625 p. s. i. A liquid product weighing 118.5 grams was recovered and on fractional distillation yielded the following: 4.5 grams of dichlorosilane, 11.6 grams of trichlorosilane, 1.2 grams silicon tetrachloride, 65.1 grams of benzene, about ½ gram of monophenyldihydrogen monochlorosilane, 4.2 grams of phenyldichlorosilane, 3.2 grams of phenyltrichlorosilane, 20.0 grams of diphenyldichlorosilane and 2.2 grams of high boiling residue.

EXAMPLE IV

Example IV shows that benzene and dichlorosilane can be reacted at temperatures as low as 150° C.

A 300 cubic centimeter stainless steel pressure reactor was charged with 0.70 mole (54.5 grams) of benzene, 0.21 mole (21.6 grams) dichlorosilane, 0.30 mole (40.4 grams) trichlorosilane and 0.02 mole of boron trichloride. The reactor was placed in a rocking furnace and heated to 150° C. for 12 hours. When cooled to room temperature there existed 220 p. s. i. residual pressure in the reactor. The liquid products weighed 110.8 grams and yielded 4.26 grams of phenyldichlorosilane on fractionation.

In order that the pertinency of these examples may be more readily understood, Table II, below, is furnished.

In this table the examples are listed in the order above and the varied condition is listed in the table. Yields are calculated on the basis of the corresponding chlorosilane, except in the reaction in the absence of trichlorosilane where the yields are calculated on the basis of the dichlorosilane. According to the analysis as previously noted, the yields of $\phi_2SiCl_2$ in Examples I and II are upper limits.

*Table II*

| Example | Varied Condition | Mole Percent Yields | | | Yield Ratio, $\phi SiHCl_2/\phi_2 SiCl_2/\phi SiCl_3$ |
|---|---|---|---|---|---|
| | | $\phi SiHCl_2$ | $\phi_2 SiCl_2$ | $\phi SiCl_3$ | |
| I | No catalyst | 41.9 | 18.2 | 7.6 | 5.6/2.4/1 |
| II | do | 39.9 | 8.3 | 7.2 | 5.6/1.2/1 |
| III | No HSiCl₃ | 7.7 | 26.3 | 5.0 | 1.6/5.3/1 |
| IV | Low Temp. (150° C.) | 11.5 | | | |

By way of demonstrating the practicality of a larger scale operation a laboratory scale continuous flow apparatus was utilized. A selection of runs made within the preferred operating range of pressure, temperature, mole ratio of reactants and catalyst concentration is listed in Table III. The reactants were premixed in a feed can which was placed on a weighing scale to register the withdrawal rate. Dry nitrogen was introduced above the liquid in the reservoir to prevent vaporization of the low boiling dichlorosilane in the feed line to the pump. The liquid was pressurized by a reciprocating plunger type pump and fed to a heavy walled reactor tube immersed in a high temperature salt bath. The effluent from the reactor passed through an automatic back pressure valve to a refrigerated separator from which the permanent gases such as hydrogen were continuously vented while the liquid phase was periodically withdrawn and analyzed. The data in Table III serve to illustrate the practice of our invention in a continuous flow process.

*Table III*

| Temp. °C. | Press., p. s. i. | Reactant Mole Ratio, $C_6H_6/H_2SiCl_2/HSiCl_3$ | | | Mole Percent BCl₃ | Product [1] | | | | |
|---|---|---|---|---|---|---|---|---|---|---|
| | | | | | | Difunctional | | | Trifunctional | |
| | | | | | | Conv., Percent | Eff., Percent | Mole Percent $\phi SiHCl_2$ | Conv., Percent | Eff., Percent |
| 412 | 2,000 | 8 | 1 | 2 | 0.1 | 59 | 77 | | 4 | 31 |
| 406 | 2,000 | 8 | 1 | 2 | 0.5 | 54 | 69 | 33 | 13 | 71 |
| 432 | 2,000 | 8 | 1 | 2 | 0.5 | 67 | 76 | 63 | 18 | 83 |
| 445 | 2,000 | 8 | 1 | 2 | 0.5 | 62 | 71 | 34 | 22 | 76 |
| 399 | 2,100 | 7 | 1 | 1 | 0.1 | 47 | 47 | 56 | 5 | 100 |
| 369 | 4,000 | 8 | 1 | 2 | 0.5 | 74 | 84 | 77 | 18 | 78 |
| 400 | 4,000 | 8 | 1 | 2 | 0.5 | 77 | 92 | 79 | 32 | 52 |
| 442 | 4,000 | 8 | 1 | 2 | 0.5 | 79 | 81 | 72 | 53 | 96 |
| 336 | 2,000 | 4 | 1 | 2 | 0.5 | 63 | 83 | 92 | 3 | 45 |
| 444 | 2,000 | 4 | 1 | 2 | 0.5 | 66 | 92 | 83 | 21 | 87 |
| 487 | 2,000 | 4 | 1 | 2 | 0.5 | 97 | 100 | 94 | 22 | 54 |
| 306 | 4,000 | 4 | 1 | 2 | 0.5 | 52 | 57 | 75 | 6 | 100 |
| 340 | 4,000 | 4 | 1 | 2 | 0.5 | 53 | 58 | 92 | 10 | 94 |
| 367 | 4,000 | 4 | 1 | 2 | 0.5 | 57 | 61 | 80 | 19 | 100 |
| 372 | 2,000 | 5 | 1 | 1 | 0.1 | 54 | 57 | 91 | | |
| 412 | 2,100 | 5 | 1 | 1 | 0.1 | 68 | 68 | 82 | | |
| 457 | 2,100 | 5 | 1 | 1 | 0.1 | 69 | 69 | 80 | 14 | 100 |

[1] The product data is listed as conversion and efficiency of the dichlorosilane and trichlorosilane in the charged mixture to difunctional product (phenyldichlorosilane and diphenyldichlorosilane) and to trifunctional product (phenyltrichlorosilane) respectively. Thus "conversion" is the molar ratio of product component to the corresponding reactant charged while "efficiency" is the molar ratio of the product component to the corresponding reactant consumed. The mole percent of phenyldichlorosilane in the difunctional product is listed under "Mole Percent $\phi SiHCl_2$."

In particular, attention is called to Example III, the reaction without HSiCl₃, wherein the product is predominantly diphenyldichlorosilane and the sum of the dichloro products is less than that of the preceding three examples. Furthermore, Examples I and II demonstrate that the product is predominantly phenyldichlorosilane.

In the practice of this invention to produce phenyldichlorosilanes a flow type of apparatus is particularly convenient since a large amount of material can be processed in relatively small equipment provided a fast reaction can be caused to occur. High temperature and high pressure have been found to promote a faster reaction. Without resorting to a catalyst we have produced phenyl derivatives of dichlorosilane in an amount up to 19.8 weight percent of the total product at a calculated contact time of 0.99 minute. In the operation of this process pressure is necessary and 1,000 to 20,000 p. s. i. is satisfactory. From the standpoint of operation with commercially available equipment, the range of 2,000 to 4,000 p. s. i. is preferred. The preferred temperature range is 300 to 500° C.

What is claimed is:

1. The method for production of phenyldichlorosilane which comprises subjecting a reaction mixture of benzene, trichlorosilane and dichlorosilane to elevated temperatures and pressures, said elevated temperatures being greater than 150° C. and said elevated pressures being at least sufficient to maintain a liquid phase, and said reaction mixture containing a mole ratio of trichlorosilane to dichlorosilane of at least 0.1 of a mole of trichlorosilane to 1 mole of dichlorosilane.

2. The method for production of phenyldichlorosilane which comprises subjecting a reaction mixture of benzene, trichlorosilane and dichlorosilane to a temperature greater than 150° C. and a pressure greater than 1,000 p. s. i., said temperature and pressure being such that a liquid phase is maintained, and said reaction mixture containing a mole ratio of trichlorosilane to dichlorosilane of at least 0.1 of a mole of trichlorosilane to 1 mole of dichlorosilane, and a mole ratio of benzene to total silanic hydrogen of said chlorosilanes of 1 to 3 moles of benzene to 1 mole of silanic hydrogen.

3. The method for production of phenyldichlorosilane which comprises subjecting a reaction mixture of benzene, trichlorosilane and dichlorosilane to a temperature of 150° C. to 500° C. and a pressure of from 1,000 to 20,000 p. s. i., said reaction mixture containing a mole ratio of trichlorosilane to dichlorosilane of at least 0.1 of a mole of trichlorosilane to 1 mole of dichlorosilane, and a mole ratio of benzene to the total silanic hydrogen of said chlorosilanes of 1 to 3 moles of benzene to 1 mole of silanic hydrogen.

4. The method for production of phenyldichlorosilane which comprises subjecting a reaction mixture of benzene, trichlorosilane and dichlorosilane to a temperature of 150° C. to 500° C. and a pressure of from 1,000 to 20,000 p. s. i., said reaction mixture containing a mole ratio of trichlorosilane to dichlorosilane of from 0.1 to 2 moles of trichlorosilane to 1 mole of dichlorosilane, and a mole ratio of benzene to the total silanic hydrogen of said chlorosilanes of 1 to 3 moles of benzene to 1 mole of silanic hydrogen.

5. The method for production of phenyldichlorosilane which comprises subjecting a reaction mixture of benzene, trichlorosilane and dichlorosilane to a temperature of from 300° C. to 500° C. and a pressure of from 1,000 to 4,000 p. s. i., said reaction mixture containing a mole ratio of trichlorosilane to dichlorosilane of from 1 to 2 moles of trichlorosilane to 1 mole of dichlorosilane, and a mole ratio of benzene to the total silanic hydrogen of said chlorosilanes of 1 to 2 moles of benzene to 1 mole of silanic hydrogen.

6. The method for production of phenyldichlorosilane which comprises subjecting a reaction mixture of benzene, trichlorosilane and dichlorosilane to elevated temperatures and pressures, said elevated temperatures being greater than 150° C. and said elevated pressures being at least sufficient to maintain a liquid phase, and said reaction mixture containing a mole ratio of trichlorosilane to dichlorosilane of at least 0.1 of a mole of trichlorosilane to 1 mole of dichlorosilane, and a metal halide Lewis Acid catalyst.

7. The method for production of phenyldichlorosilane which comprises subjecting a reaction mixture of benzene, trichlorosilane and dichlorosilane to a temperature greater than 150° C. and a pressure greater than 1000 p. s. i., said temperature and pressure being such that a liquid phase is maintained, and said reaction mixture containing a mole ratio of trichlorosilane to dichlorosilane of at least 0.1 of a mole of trichlorosilane to 1 mole of dichlorosilane, and a mole ratio of benzene to total silanic hydrogen of said chlorosilanes of 1 to 3 moles of benzene to 1 mole of silanic hydrogen, and a metal halide Lewis Acid catalyst.

8. The method for production of phenyldichlorosilane which comprises subjecting a reaction mixture of benzene, trichlorosilane and dichlorosilane to a temperature of 150° C. to 500° C. and a pressure of from 1,000 to 20,000 p. s. i., said reaction mixture containing a mole ratio of trichlorosilane to dichlorosilane of at least 0.1 of a mole of trichlorosilane to 1 mole of dichlorosilane, and a mole ratio of benzene to the total silanic hydrogen of said chlorosilanes of 1 to 3 moles of benzene to 1 mole of silanic hydrogen, and a metal halide Lewis Acid catalyst.

9. The method for production of phenyldichlorosilane which comprises subjecting a reaction mixture of benzene, trichlorosilane and dichlorosilane to a temperature of 150° C. to 500° C. and a pressure of from 1,000 to 20,000 p. s. i., said reaction mixture containing a mole ratio of trichlorosilane to dichlorosilane of from 0.1 to 2 moles of trichlorosilane to 1 mole of dichlorosilane, and a mole ratio of benzene to the total silanic hydrogen of said chlorosilanes of 1 to 3 moles of benzene to 1 mole of silanic hydrogen, and a metal halide Lewis Acid catalyst.

10. The method for production of phenyldichlorosilane which comprises subjecting a reaction mixture of benzene, trichlorosilane and dichlorosilane to a temperature of from 300° C. to 500° C. and a pressure of from 1,000 to 4,000 p. s. i., said reaction mixture containing a mole ratio of trichlorosilane to dichlorosilane of from 1 to 2 moles of trichlorosilane to 1 mole of dichlorosilane, and a mole ratio of benzene to the total silanic hydrogen of said chlorosilanes of 1 to 2 moles of benzene to 1 mole of silanic hydrogen, and a metal halide Lewis Acid catalyst.

References Cited in the file of this patent

UNITED STATES PATENTS

| | | |
|---|---|---|
| 2,591,668 | Barry et al. | Apr. 8, 1952 |
| 2,594,860 | Brewer | Apr. 29, 1952 |
| 2,600,198 | Brewer | June 10, 1952 |